April 2, 1957 A. E. GREENE Re. 24,300

ELECTRIC INDUCTION FURNACES

Original Filed Feb. 27, 1950

INVENTOR.

United States Patent Office

Re. 24,300
Reissued Apr. 2, 1957

24,300

ELECTRIC INDUCTION FURNACE

Albert E. Greene, Medina, Wash.

Original No. 2,641,621, dated June 9, 1953, Serial No. 146,527, February 27, 1950. Application for reissue June 7, 1954, Serial No. 435,102

2 Claims. (Cl. 13—29)

Figure 1:
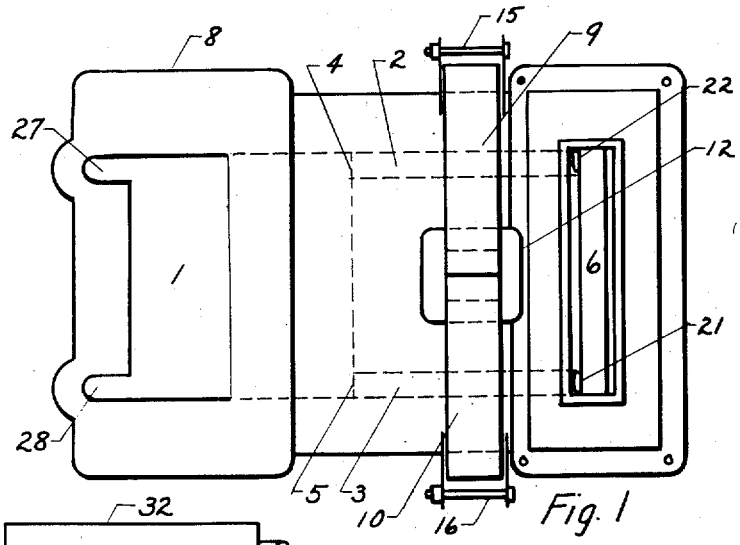

Matter enclosed in heavy brackets [ ] appears in the original patent but forms no part of this reissue specification; matter printed in italics indicates the additions made by reissue.

This invention relates to induction furnaces of the submerged resistor type for melting metal like aluminum or similar light metal or alloy. The invention relates particularly to an improved construction of furnace, in the operation of which there is no tendency for clogging matter to collect in the submerged channels or chambers which are not easily accessible from the top of the furnace without stopping its heating. It also relates to an improved construction of a tilting furnace, *and in certain modifications of the invention an improved apparatus is provided which greatly simplifies the lining of the furnace.* The formation of clogging matter in the submerged resistor tubes or channels in such induction furnaces used for melting aluminum is well known and heretofore has presented a serious problem in order to avoid shutting down the furnace and emptying it of the molten aluminum in order to remove the clogging matter.

Submerged resistor induction furnaces for aluminum have been of two types, one having a main chamber from the bottom of which resistor tubes or channels extend vertically down to an enlarged bottom chamber directly below the main chamber, this bottom chamber being larger than the resistor tubes or channels which terminate in it, and with provision for inducing current in the metal in this circuit thru the vertical tubes and horizontal bottom chamber and thru the main chamber. Clogging matter collects in the vertical channels and can be pushed down thru them into the enlarged bottom chamber. This clogging matter which collects in this bottom enlarged chamber can be removed therefrom by opening one end of the bottom chamber and removing the clogging matter after emptying the furnace of molten aluminum. This method of cleaning the furnace requires stopping the heating and emptying the metal out of the bottom chamber, a procedure which is costly and objectionable because of the resultant delay and expense. The furnace of the Tama U. S. Patent No. 2,339,964 of January 25, 1944, is of this type.

The other type referred to has two separate main chambers spoken of as hearths, both chambers being open above the top surface of the molten metal, altho, of course, a roof or cover to these chambers may be provided. The two chambers in this type of furnace are connected with each other by sloping resistor tubes or channels extending from the lower part of one chamber to the lower part of a lower chamber, the bottoms of the two chambers being at different levels. The resistor circuit in such a furnace is thru the metal in the resistor tubes and thru the metal in both hearth chambers, forming one or more single turn circuits around a leg of a magnetic core. A primary winding is provided on such core and the metal in the channels and chambers form a secondary circuit in which current is induced to heat it. Clogging matter collects in the resistor tubes or channels when aluminum is melted and heated therein. This clogging matter can be removed from the sloping tubes by means of a tool entering the tube from the higher chamber, thus pushing the clogging matter into the bottom of the lower chamber where it remains until removed by suitable tools entering that chamber from its top. The clogging matter collecting there does not, either at the time it is pushed down out of the tube or tubes into the lower chamber, or at a later time, pass up thru a tube or tubes into the higher chamber. Such clogging matter pushed down into the bottom of the lower chamber may be removed by suitable tools entering from the top of the chamber during operation. To remove this clogging matter from this lower chamber requires that it be open above the metal in it so that the tools can enter and extend down to the bottom and pick up the clogging matter which has been pushed down there from the slanting tubes. This type of furnace is illustrated in the Tama Patent No. 2,427,817 of September 23, 1947; also in the Swedish Patent No. 109,793 and in the Swiss Patent No. 224,499 of March 1, 1943. Both these earlier types of induction furnaces have objectionable features, *that is, the type described in the Tama Patent 2,339,964 referred to above and the other Tama patent last mentioned above, No. 2,427,817.* The bottom chamber of the earlier Tama patent where the clogging matter collects and from which it must be removed by emptying the furnace and opening the bottom chamber at one end to remove the clogging matter results in an objectionable delay and expense. It is one purpose of the present invention to avoid such delay and inconvenience.

In the other type of induction furnace having two main chambers both open at the top above the molten metal in them, the clogging matter which collects in the tubes must be pushed down thru them by a suitable tool entering from above the metal in the higher chamber and pushed down into the bottom of the lower chamber. From there it can be scooped up and removed by a suitable dipper or tool. The clogging matter pushed down into the lower chamber which chamber is open to the top as is the upper chamber, will not pass back up into the higher chamber *as it does in applicant's present invention.* This type of furnace *of the Tama Patent No. 2,427,817* has a large shell surface and holds much metal, particularly in comparison with the furnace of the present invention. Furthermore, in the cleaning of the clogging matter out of a tube in the present invention, pushing it down into a submerged, closed-on-top chamber, the clogging matter thus pushed down thru one tube will not remain in the bottom of that submerged chamber but will pass up thru [another] *the other* tube into the main chamber, when removed from one tube by a tool. *This action takes place in a furnace having two tubes extending down from the lower part of a main chamber at an angle of about 45 degrees. In such a furnace in such a position the action of removing the clogging matter collected in one tube begins. It begins by pushing the tool down thru that tube and everything in front of it in its movement has got to move along. And regardless of the reason why, it is a fact that the clogging matter moves along thru the submerged cross chamber and up the other tube and then it is out. It is not necessary to use or to even have an end exit from this bottom cross chamber for access into it to remove the clogging matter collected there as the Tama Patent 2,339,964 shows. In applicant's furnace the clogging matter does not stay there in that bottom cross chamber.*

*In the first furnace which showed the excellent result of some six months of continuous operation without ever during that time getting into it, applicant had risers extending up a few inches above the top of the cross chamber and the cross chamber top was also above the openings of the tubes, above the tops of those tubes where they entered it. Just what influence those risers had on the movement of the clogging matter applicant does not*

*know. He does know, however, that not only clogging matter moved up the second tube but the metal in which it was conveyed also moved up into the main chamber thru the other tube. Furthermore, the shell construction of the present invention does not have an end opening since the clogging matter does not collect there; but the shell construction of the apparatus of this invention does have a certain improved construction whereby the special chamber construction is accomplished also embodying other advantageous features more particularly referred to farther on in this specification.* Furthermore, the two chamber design of the Tama patent does not lend itself to the construction of large holding capacity furnaces, whereas the present invention does. Furthermore, the replacing of the refractory material which forms the tube channels of the Tama requires removal and subsequent replacement of a large amount of refractory *material* in order to put the furnace back in operating condition.

In the earlier Tama patent design in which the tubes are vertically disposed from the bottom of the main chamber straight down into an enlarged bottom chamber, there is the further objection of increased metal static pressure in the bottom chamber, and since aluminum is difficult to retain and to keep from getting into and thru the lining, the greater static pressure of the *molten* metal in that Tama design is a further serious objection and disadvantage.

The present invention is based on the discovery that clogging matter forced down thru a sloping resistor tube into a back submerged, lower chamber of somewhat but not greatly enlarged cross section between tubes than the cross section of the tubes themselves does not remain in this lower submerged chamber as it does in the open top bottom chamber of the Tama patent (*2,427,817*) when forced down out of a resistor tube; *or as it does in the other Tama patent when forced down into the bottom chamber thru the vertical tubes;* but instead of remaining there it passes up thru another tube into the main chamber from which it is easily removed. No stopping of the current flow is necessary and no opening of the bottom chamber of the present invention for long periods of time, usually many months. The improved furnace of this present invention has a single main chamber and *two* sloping resistor tubes or channels in refractory material extending downwardly from the bottom or lower part of the main chamber and away from that main chamber to a submerged cross channel or chamber. This submerged cross chamber is of somewhat larger cross sectional area than that of the resistor tubes which slope down and connect or open into it. The top of the submerged chamber is preferably slightly above the openings of the tubes into it when the furnace is in its normal operating position. In that position the angle of the resistor tubes may be about 45 degrees from the horizontal. The furnace may of course be stationary, but I have found that provision of tilting means is a special advantage, for it permits tilting the furnace so that the molten metal in the bottom of the main chamber need not enter the tubes until the furnace is tilted back to its normal operating position. The stationary furnace could of course be tilted by means of a crane.

*An important difference between the furnace of this invention on the one hand, and the furnace of Tama patents, is as follows: the furnace of this invention has two tubes whereas the Tama furnace usually has three tubes, spoken of as the "three channel" furnace. The further difference, results in part from the movement of the clogging matter. In the Tama "twin coil" furnace the clogging matter and the metal which might move it, have two paths to follow, and the center path of the "twin coil" furnace is larger than the other two tubes. This difference holds even tho the twin coil furnace of Tama Patent 2,474,443 might assume a sloping position and Tama has provided the end exit in these twin coil furnaces of his. Of course the furnace of the present invention could be tilted to have the tubes vertical, but then the molten metal static pressure would be much greater and tend to force aluminum thru the lining.* When the furnace *of the present invention* is tilted *forward* it is possible to provide enough molten metal in the chamber *to start the current flow* without such metal entering the tubes, and then by tilting the furnace into its normal operating position the molten metal enters the tubes and the submerged bottom chamber and a single turn circuit of metal around a leg of a magnetic core between the tubes will permit of inducing current thru the metal as a secondary of a transformer.

The resistor tubes of the furnace of this invention are preferably straight and they are so located that a straight tool entering from above the top of the molten metal in the main chamber can pass thru a tube so as to push clogging matter which may have formed or collected in the tube down into the submerged chamber and from the submerged chamber the clogging matter [automatically] moves *thru the submerged chamber* and passes up another tube into the main chamber. *The cause of this movement is not known for sure. When the tool is pushed down a tube and removes clogging matter the tool also pushes molten metal along first thru the tube and then up another tube. This is evidenced by the hotter aluminum which comes up a second tube into the main chamber. Why this effect is not possible in the vertical tube Tama furnace is not known; but that is the fact as far as this applicant knows. However, in the sloping tube type of furnace with the enlarged cross chamber extending up above the tops of the openings of the tubes into that cross chamber, and especially with the modification in which risers extend up from that cross chamber at about the locations where the tubes enter it, it may be that the flushing movement of the molten metal tends to form a vaccum in these risers or upwardly extending portions of the cross chamber, aiding in some mechanical way the movement of the clogging matter up a second tube. At any rate, in the operation of my furnace for about six months of continuous operation without emptying it during that period of time, and in which furnace there were only two sloping tubes between the main chamber and the cross chamber, when the furnace was opened up there was no clogging matter present in either the bottom cross chamber or in the risers which extended up above the top of the openings of the tubes into it.* The flow of current is not stopped when pushing a tool down thru a tube, *even in the furnace which has only two tubes.* Unless dirty metal is melted it is usually only necessary to push a tool thru each tube once every eight hours in order to keep the furnace in continuous operation. It has been necessary to make the vertical cross section of the submerged chamber slightly larger than that of the tubes, and if the cross section of the submerged chamber is about three times that of the tubes, *and if it extends up above the tops of the tube openings into it,* this seems to be sufficient. It is preferable if the tubes enter the bottom of the submerged chamber or at any rate so that the top of that submerged chamber is slightly above the top of the opening of the tube into it. In an alternative construction, the cross chamber may have a riser extending slightly above it at either end these risers having their top ends closed and being entirely submerged when the furnace is in its normal operating position.

There is no need for further enlargement of the bottom submerged chamber. If it were not submerged so as to be full of molten metal when the furnace is in operation, *except possibly when the tool is suddenly withdrawn from a tube to be pushed down again, possibly forming a temporary vacuum or space above the metal in the submerged cross chamber,* but were open to the top, like the Tama furnace *of U. S. Patent No. 2,427,817,* then the clogging matter would not pass thru it and back up into the higher chamber. Apparently it is the surge effect *or flushing effect* in the furnace of this invention which forces the clogging matter pushed down into the submerged chamber along thru it and up another tube into the main chamber.

The construction and operating advantages of the *furnace of this* invention will be better understood by reference to the annexed drawings which show a tilting type of furnace embodying this invention and also showing two modifications of the submerged chamber shape and arrangement.

Figure 2:
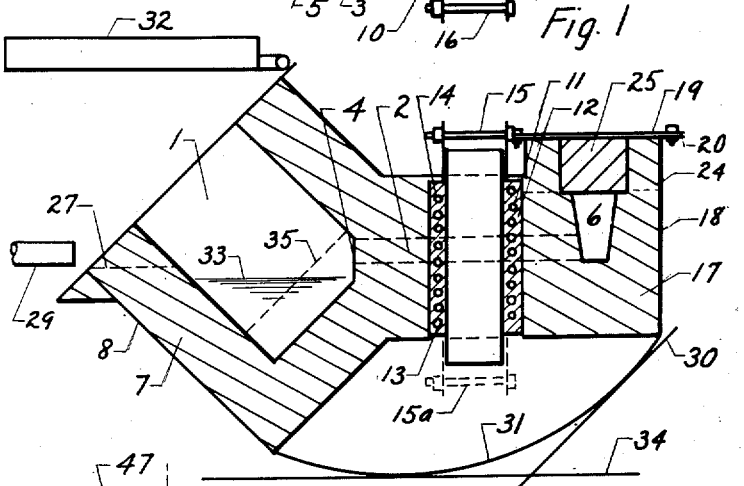

Referring to the drawings, Fig. 1 is a plan view of a furnace embodying my present invention, but *shown* tilted into a position in which the resistor tubes are approximately horizontal, so that the molten metal, serving as a starting charge, can be held in the tilted main chamber without entering the tubes [of] *and* the submerged chamber. Fig. 2 is a sectional elevation view of the furnace of Fig. 1, showing the starting charge and also showing the submerged chamber in cross section, empty of metal when the furnace is thus tilted. This Fig. 2 also shows the relative position of a cleaning tool in line or in position to enter a tube. Such a tool is used, of course, when the furnace is in its normal operating position with the tubes and the submerged chamber filled with molten metal and the level of the molten metal in the main chamber above the tubes which extend down from the main chamber.

Figure 3:
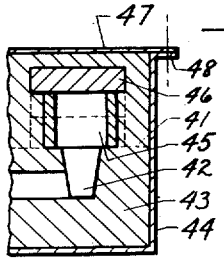
Figure 4:
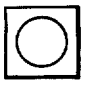

Fig. 3 is a sectional elevation view of a modified design of submerged chamber having a riser at each end, but closed on top so that the chamber and also the risers are fully submerged when in operation. Fig. 4 is a plan view of a part of the refractory riser of Fig. 3.

Referring now to Figs. 1 and 2, the furnace shown has a single main chamber 1 in refractory material 7 in a metal shell 8. Two resistor tubes in refractory material connect the lower part of the chamber 1 at 4 and 5 with the lower part of the submerged chamber 6, when the furnace is in its normal operating position. This normal operating position is such that the line 30 is horizontal, and then the metal surface in the main chamber will be parallel to the line 35.

Fig. 1 shows the secondary circuit in molten metal around a leg of a transformer core. A magnetic core encircles each tube, the top of one core being marked 9. The two cores abut each other so that the center core is about twice the area in cross section of each of the two outer legs of the cores. The other top core is 10. A primary coil 11 encircles the main center leg or part of the core assembly between the two resistor tubes 2 and 3 shown in dotted lines. This primary coil can be a water-cooled copper tube coil, suitably insulated. The back chamber shell is marked 18 and the refractory 17. The back chamber is held against the core assembly by bolts 15 and 16 and bolts corresponding to bolts 15 and 16 but not shown would hold the lower parts of the core against the shell. The two ends of the primary coil are indicated at 13 and 14 and are preferably connected to a water-supply circuit for cooling. A top plate 19 of metal is provided to clamp down against the refractory in the back chamber shell when the lining is in place. Bolt holes are indicated in the top flange 20 of this back chamber shell and bolts hold the top plate 19 to the flange 20.

In Fig. 1 the openings of the resistor tubes 2 and 3 into the back submerged chamber 6 are shown at 21 and 22. This back submerged chamber is formed preferably by ramming refractory material up to the bottom of the submerged chamber 6 and then placing a pattern or form in the position 6, this form having the shape of this back chamber. Then pipes are inserted like that at 29 so that the axis of the pipe forms the axis of the tube in refractory material, the pipes reaching to the form. Refractory material, such as high alumina material, is rammed around the pipes up to their opening into the chamber 6. Then the form is removed by drawing it out of the refractory and then a refractory block is placed over the chamber 6 and then the pipes can be withdrawn so that the refractory channels are complete up to their openings into the main chamber. The refractory may then be put in the main chamber. Notches 27 and 28 can serve for pouring metal by tilting the furnace. Ordinarily the furnace is used for ladling metal out. A top cover 32 is provided.

The shell can have a tilting rocker 31. The normal position for melting will be that corresponding to having the rocker rest on the line 30 as horizontal. The metal level then will correspond or be parallel to the line 35. The furnace can be started by tilting it over until the tubes are about horizontal and metal can then be admitted into the main chamber as indicated at 33. Then by tilting the furnace into the normal operating position, the metal fills the tubes and the submerged chamber and partly fills the main chamber, preferably several inches above the tube openings into that main chamber. Then the heating can begin, connecting the transformer primary to a source of alternating current such as 110 volt 60 cycle single phase current. The power is adjusted by adjusting the voltage applied to the primary winding.

Referring to Figs. 3 and 4, a modified back submerged chamber construction in accordance with one embodiment of the invention is shown. The shell is shown at 44 with refractory material inside it at 43 up to the top of the pattern form 42, making a chamber which when closed on top will be slightly larger in cross section than the tubes, and extending slightly above the top openings of the tubes into it, the number 41 indicating the top of the submerged channel between the tube ends. When the refractory is rammed in to the level of that line (that is with the furnace tilted as shown in Fig. 2) then the pattern form is removed and a refractory block 49, or a shape with a hole in it, as indicated in Fig. 4, is placed on top of the chamber opening, one such block at each end approximately over the tube openings into the chamber 42, and then between these refractory riser blocks 49, flat bricks or shapes *46* cover the rest of the top opening of the chamber 42, so that the refractory can then be rammed around the riser blocks and the flat bricks to completely close in the top of the chamber 42. The tops of the riser blocks 49 are then closed by brick or flat refractory shapes *46* and then the refractory is rammed around the blocks and flat shapes *46* so that the chamber is then a submerged back channel or chamber between the tube openings into it (*when filled with molten metal*) and extending upwardly slightly above the top openings of the tubes where they enter it. A top plate 47 is then bolted down to the flange 48 in the same manner as described for the furnace of Figs. 1 and 2.

When the furnace is in its normal operating position with the tubes extending downwardly at an angle of about 45 degrees *from the horizontal,* the back submerged chamber extends slightly above the tops of the tube openings into it. This extra capacity of the back submerged chamber appears to increase the surge effect and to cause *or aid in causing* the clogging matter forced down into it from one tube by the cleaning tool to pass through the cross chamber and up another *or the other* tube.

The metal shell assembly of this invention is smaller for a given main chamber capacity and much simpler, *especially to line and reline,* than [in] other induction furnaces used by me or others. In the construction of the furnace shell in this invention the main chamber shell has an extension downward and back or away from the shell, approximately parallel to the resistor tubes down to the location where the shell abuts the transformer core assembly. This extension of the main chamber shell encloses the refractory material surrounding the upper ends of two or more resistor tubes and also holds the core assembly between it and a similar part of the submerged chamber shell, the two shells being held against each other with the core assembly between by bolts. *The special advantage of the furnace of this invention will be better understood by reference to Fig. 2 in which the furnace is shown in the tilted position in which the tubes are approximately horizontal. When in this position the back chamber shell opens to the top and is closed, after being lined, by the plate 19. In this position it is easy, simple and quick to place the pipes in place and to get at and line the back chamber shell to form the back submerged chamber, the chamber which is submerged when the furnace is in operation.*

The inclined position of the resistor tubes in combination with a submerged back lower chamber is an important improvement in the construction of induction furnaces of the submerged resistor type and provides means for safeguarding the continuous operation of such a furnace *for long periods of continuous operation of such a furnace.* It efficiently solves the problem of clogging matter removal while the furnace remains in continuous operation, and provides for the use of straight cleaning tools, *and for very simple lining and relining of the furnace chambers.*

*The two tube furnace provides sufficient force to take the clogging matter clear through the submerged cross chamber and up the second tube compared with the design which divides the push and which has not been shown to be able to move the clogging matter out.*

*The tilting construction of furnace having the 45 degree angle of the submerged chamber shell, is another important improvement, for it simplifies the lining of the back chamber and the method of lining the back chamber when the furnace is tilted over to the position in which the tubes are about horizontal.*

*It is understood that the angle need not be exactly or even approximately 45 degrees, and furthermore, the furnace need not be operated in that position until the tubes are cleaned.*

What I claim is:

[1. A submerged resistor type induction furnace comprising a main chamber for holding molten metal, two substantially straight melting channels connecting the bottom of the main chamber with a lower submerged chamber slightly larger in cross section than the tubes, said straight channels being inclined at an angle to permit the introduction of a cleaning tool thru them from the upper part of the main chamber above the level of the molten metal, and a transformer assembly threading the secondary loop formed by the melting channels.]

[2. A submerged resistor type induction furnace comprising a main chamber in a metal shell for holding molten metal, two substantially straight melting channels extending downwardly from the bottom of the main chamber at an angle of about 45 degrees to permit the introduction of cleaning tools from the outside of the furnace above the level of the top of the molten charge, a submerged channel or chamber slightly larger in cross section than that of the tubes connecting their lower ends; and a transformer assembly threading the secondary loop formed by said melting channels.]

[3. A furnace like that of claim 2 and means for tilting the shell whereby metal in the tubes and submerged channel connecting their lower ends would empty into the main chamber when the furnace is tilted sufficiently.]

[4. A submerged resistor type induction furnace comprising a main chamber in refractory material in a metal shell; resistor tubes in refractory material and substantially straight connecting the bottom of said main chamber with a submerged channel open between the bottom ends of said tubes and of slightly larger cross sectional area than that of the tubes; a transformer assembly comprising a core leg with primary coil thereon between the tubes for inducing current in the molten metal as secondary.]

[5. A furnace like that of claim 1 in which the submerged chamber which is slightly larger than the tubes in cross section, is so located with respect to the openings of the tubes into it that it extends slightly above the top openings of the tubes into it.]

*6. A submerged resistor type induction furnace having a main chamber in refractory material in a main chamber shell; a lower back submerged chamber in refractory material in a back chamber shell and resistor tubes connecting said chambers; an opening in the main chamber shell at its lower back side toward the back chamber shell thru which opening the resistor tubes in refractory material extend from the lower back part of the main chamber to the back, submerged chamber; an opening in the back chamber shell toward the opening in the main chamber shell thru which said tubes extend; a tilting frame supporting said shells and also a transformer element comprising a core and primary coil thereon; means for holding the shells against each other with the transformer element between; the said resistor tubes extending down and back from the lower back part of the main chamber at an angle of about 45 degrees to the horizontal toward the back submerged chamber when the furnace is in its normal operating position; means for tilting the furnace to a position in which the resistor tubes would be about horizontal in which position the back chamber shell has a top opening above the position of the submerged chamber, and means for closing said top opening by a metal cover to hold the refractory in place.*

*7. A furnace like that of claim 6 in which there are only two resistor tubes.*

References Cited in the file of this patent or the original patent

UNITED STATES PATENTS

| | | |
|---|---|---|
| Re. 22,602 | Tama | Feb. 13, 1945 |
| Re. 22,948 | Tama et al. | Dec. 9, 1947 |
| 1,751,856 | Greene | Mar. 25, 1930 |
| 1,751,912 | Greene | Mar. 25, 1930 |
| 1,819,238 | Greene | Aug. 18, 1931 |
| 1,851,575 | Greene | Mar. 29, 1932 |
| 1,920,380 | Greene | Aug. 1, 1933 |
| 2,339,964 | Tama | Jan. 25, 1944 |
| 2,423,912 | Tama et al. | July 5, 1947 |
| 2,427,817 | Tama | Sept. 23, 1947 |
| 2,474,443 | Tama et al. | June 28, 1949 |
| 2,494,501 | Bahney et al. | Jan. 10, 1950 |
| 2,499,540 | Tama | Mar. 7, 1950 |
| 2,499,541 | Tama | Mar. 7, 1950 |
| 2,520,349 | Tama | Aug. 29, 1950 |
| 2,641,621 | Greene | June 9, 1953 |

FOREIGN PATENTS

| | | |
|---|---|---|
| 109,793 | Sweden | Dec. 16, 1943 |
| 143,504 | Great Britain | May 10, 1920 |
| 224,999 | Switzerland | Mar. 1, 1943 |
| 265,333 | Switzerland | Feb. 16, 1950 |